C. B. SCHOENMEHL & W. STRAW.
BATTERY ELECTRODE SUPPORT.
APPLICATION FILED APR. 9, 1909.
945,614.
Patented Jan. 4, 1910.
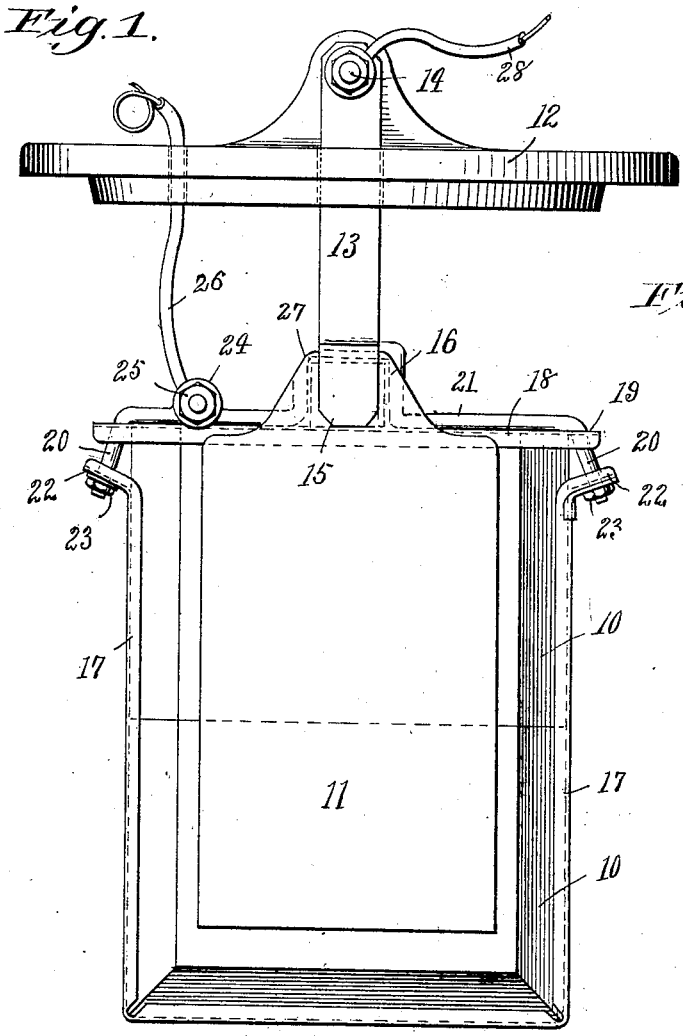
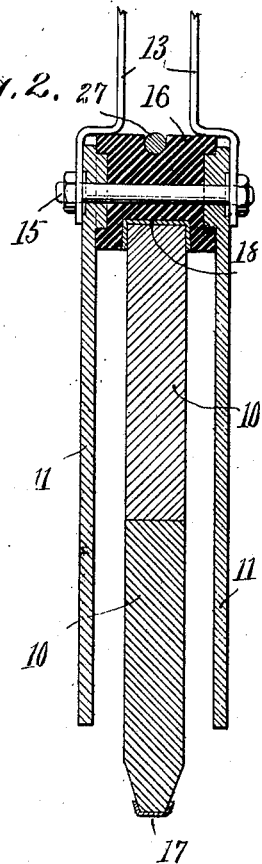
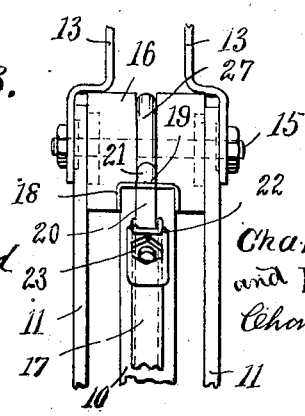
WITNESSES
Ruth Raymond
Elbert O. Hull.
INVENTORS
Charles B. Schoenmehl
and Wilfred Straw
Chamberlain & Newman
their ATTORNEYS

UNITED STATES PATENT OFFICE.

CHARLES B. SCHOENMEHL AND WILFRED STRAW, OF WATERBURY, CONNECTICUT; SAID STRAW ASSIGNOR TO SAID SCHOENMEHL.

BATTERY-ELECTRODE SUPPORT.

945,614.  Specification of Letters Patent.  Patented Jan. 4, 1910.

Application filed April 9, 1909. Serial No. 488,797.

*To all whom it may concern:*

Be it known that we, CHARLES B. SCHOENMEHL and WILFRED STRAW, citizens of the United States, and residents of Waterbury, in the county of New Haven and State of Connecticut, have invented certain new and useful Improvements in Battery-Electrode Supports, of which the following is a specification.

Our invention relates to improvements in primary batteries and especially to what are known as the zinc and copper oxid plate forms of batteries, as employed in connection with a suitable solution.

The object of the invention is to produce a simple and desirable construction of frame or support for retaining said elements in their relative positions when in use within a battery jar, and in a way which will permit of the same being suspended from the cover thereof.

The frame as designed is adapted to be made to accommodate either a single or two part compressed oxid plate, and a suitable zinc plate on either side thereof.

The supporting frame is constructed of sheet metal and wire combined, cut, shaped and formed in a simple, practical and desirable way to properly support said elements at the same time to permit of their ready attachment to or detachment from the frame, as in the matter of assembling or reassembling the parts.

Similar characters of reference will be found to designate like or corresponding parts throughout the several views of the accompanying drawings, and of which, Figure 1, shows a side elevation of our improved element support suspended from a battery cover and supporting both the positive and negative elements. Fig. 2, is a central, vertical longitudinal section through the elements and frame shown in Fig. 1, and Fig. 3, is a detailed side elevation of a portion of our supporting frame and attached elements as shown from the right hand upper side edge portion of Fig. 1.

The negative electrodes before referred to are formed of finely ground copper oxid which after being molded into form and solidified are baked and hardened to retain their form and shape, while the positive electrodes may be formed of cast or rolled zinc as desired, with suitable means for their attachment to the frame.

In detail 10 represents the said compressed copper oxid plates which constitute the negative electrode, while 11 represents the zinc plates constituting the positive electrodes.

12 indicates a battery jar cover to which the hangers 13 for the element frame are attached by means of a bolt 14. The lower portion of these hangers may be bent out and down, and perforated to receive a bolt 15 that connects the same against the zinc plates 11 and to the insulating block 16, which is supported upon the element frame.

18 represents a transverse sheet metal channel strip which is disposed across the top edge of the negative plate 10 and is provided with slots 19 on either end to receive the downwardly turned ends 20 of a wire yoke 21. The body portion of this yoke is disposed longitudinally across and against the top of this strip while the two ends are deflected downward at an acute angle to the side edges of the plate. Said ends are threaded for the connection of the angularly disposed end portion of a hanger 17 which is formed of sheet metal and suitably bent to engage the front, back, bottom and side edges of the negative plate in a way to support and retain the same. The upper end portions 22 of this hanger are disposed outward at an acute angle to the side portions and pierced to receive the ends 20 of the yoke so as to insure the said side and bottom portions being drawn up snugly against the plate by means of the nuts 23 secured to the threaded ends 20. The intermediate portion of the yoke 21 may be bent up to form an eye 24 to receive a binding screw 25 for the attachment of a field wire 26, and is further disposed up and over as at 27 to cover the insulating block 16 before mentioned. Said block being grooved to receive the wire yoke as shown in the several figures of the drawing. The second field wire 28 is preferably connected to the nut and bolt 14 before mentioned and obviously serves for connection with the positive plates which are insulated from the negative plates through the medium of the insulating block 16 seated upon the frame.

The construction of this frame is such as to rigidly secure the parts together with little or no liability of the plates coming in contact with each other when properly insulated and permits the elements to be readily removed with the removal of the cover.

From the foregoing it will be seen that the assembling of the parts would be effected by first arranging the plate or plates 10 within the hanger, which obviously would previously be found to fit, whereupon the top channel strip 18 and yoke 21 would be attached by being placed upon the top edge of the negative plate with ends of yoke disposed down through the holes of the hanger whereupon the washer and nuts would be connected to secure the parts together.

Having thus described our invention what we claim and desire to secure by Letters Patent is:—

1. An electrode support for batteries, comprising in part a top cross yoke having downwardly disposed ends, a hanger including sides to engage the edges of an electrode and having eyes in its upper ends to engage the said ends of the yoke, and means for securing said parts together.

2. An electrode support for batteries, comprising in part a top cross yoke having its outer end portions disposed at an acute angle, a hanger including sides to engage the edges of an electrode and having eyes in its upper ends to engage the ends of the yoke, and means for drawing the eyes inward and the hanger against the edges of an electrode.

3. An electrode support for batteries, comprising in part a top cross yoke having its outer end portions disposed downward at an acute angle, a hanger including sides to engage the edges of an electrode and having its upper portions disposed outward at substantially a right angle to the ends of the yoke and having eyes therein to receive the said ends, and means upon said yoke ends to draw the hanger in against the edges of the electrode.

4. An electrode support for batteries, comprising a frame including in part a top cross yoke having its ends disposed downward, a sheet metal hanger to engage an electrode and having its upper ends disposed outward and provided with eyes to receive the ends of the yoke.

5. An electrode support for batteries, comprising a frame including in part a sheet metal strip to engage the top of an electrode, a yoke member upon the strip and having its free ends disposed downward through said strips, a sheet metal hanger adapted to engage the edges of such an electrode and having its upper ends in engagement with the ends of the yoke.

6. An electrode support for batteries, comprising a frame including in part a sheet metal strip to engage the top of an electrode and having slots in its end portions, a yoke member upon the strip and having its free ends disposed downward through said slots, a sheet metal hanger adapted to engage the edges of such an electrode and provided with means at its upper end to engage the ends of said yoke.

7. An electrode support for batteries, comprising in part a wire yoke member to be arranged upon the top edge of an electrode and having its end portions disposed downward, a sheet metal hanger to engage the outer edges of such an electrode and having its upper ends provided with eyes to receive the ends of the yoke for attachment thereto.

Signed at Waterbury in the county of New Haven, and State of Connecticut, this 3rd day of April, A. D., 1909.

CHARLES B. SCHOENMEHL.
WILFRED STRAW.

Witnesses:
FRANK A. STRAW,
THEODORE E. ROGERS.